(12) United States Patent
Mirchandani et al.

(10) Patent No.: US 6,511,265 B1
(45) Date of Patent: Jan. 28, 2003

(54) COMPOSITE ROTARY TOOL AND TOOL FABRICATION METHOD

(75) Inventors: Prakash K. Mirchandani, Murfreesboro, TN (US); Bruce A. Keller, New Hope, AL (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 09/460,540

(22) Filed: Dec. 14, 1999

(51) Int. Cl.⁷ ............................. B23B 51/00; B23P 15/32
(52) U.S. Cl. ......................... 407/53; 407/118; 407/119; 408/223
(58) Field of Search ................. 407/118, 119; 408/223, 224, 225, 230, 144, 145; 428/212, 216, 325, 334, 698, 701, 702

(56) References Cited

U.S. PATENT DOCUMENTS

| | | | |
|---|---|---|---|
| 3,806,270 A | * 4/1974 | Tanner et al. | 408/56 |
| 4,277,106 A | * 7/1981 | Sahley | 299/111 |
| 4,587,174 A | * 5/1986 | Yoshimura et al. | 428/552 |
| 5,041,261 A | 8/1991 | Buljan et al. | |
| 5,110,687 A | 5/1992 | Abe et al. | |
| 5,186,739 A | * 2/1993 | Isobe et al. | 75/238 |
| 5,266,415 A | 11/1993 | Newkirk et al. | |
| 5,273,380 A | * 12/1993 | Musacchia | 408/230 |
| 5,326,196 A | * 7/1994 | Noll | 408/56 |
| 5,376,329 A | 12/1994 | Morgan et al. | |
| 5,541,006 A | 7/1996 | Conley | |
| 5,543,235 A | 8/1996 | Mirchandani et al. | |
| 5,570,978 A | * 11/1996 | Rees et al. | 227/175.3 |
| 5,677,042 A | 10/1997 | Massa et al. | |
| 5,679,445 A | 10/1997 | Massa et al. | |
| 5,686,119 A | 11/1997 | McNaughton, Jr. | |
| 5,697,046 A | 12/1997 | Conley | |
| 5,750,247 A | * 5/1998 | Bryant et al. | 428/323 |
| 5,762,843 A | 6/1998 | Massa et al. | |
| 5,776,593 A | 7/1998 | Massa et al. | |
| 5,789,686 A | 8/1998 | Massa et al. | |
| 5,792,403 A | 8/1998 | Massa et al. | |
| 5,806,934 A | 9/1998 | Massa et al. | |
| 6,022,175 A | * 2/2000 | Heinrich et al. | 407/119 |
| 6,086,980 A | * 7/2000 | Foster et al. | 428/212 |
| 6,290,438 B1 | * 9/2001 | Papajewski | 408/145 |

\* cited by examiner

*Primary Examiner*—Henry Tsai
(74) *Attorney, Agent, or Firm*—Patrick J. Viccaro

(57) ABSTRACT

A composite rotary tool includes at least first and second regions comprising first and second materials, respectively. The first and second regions are autogenously bonded and differ with respect to at least one characteristic such as, for example, modulus of elasticity, hardness, wear resistance, fracture toughness, tensile strength, corrosion resistance, coefficient of thermal expansion, or coefficient of thermal conductivity. A method for producing the composite rotary tool includes placing a first metallurgical powder into a first region of a void of a mold, and placing a second metallurgical powder into a second region of the void. The first metallurgical powder differs from the second metallurgical powder, and at least a portion of the first metallurgical is brought into contact with the second metallurgical powder. The mold is compressed to consolidate the first and second metallurgical powders to form a compact, and the compact subsequently is sintered.

30 Claims, 7 Drawing Sheets

COMPOSITE ROTARY TOOL AND TOOL FABRICATION METHOD

CROSS-REFERENCE TO RELATED APPLICATIONS

Not Applicable

FEDERALLY SPONSORED RESEARCH

Not Applicable

TECHNICAL FIELD AND INDUSTRIAL APPLICABILITY OF THE INVENTION

The present invention is generally directed to tools and tool blanks having a composite construction including regions of differing composition and/or microstucture. The present invention is more particularly directed to cemented carbide rotary tools and tool blanks for rotary tools having a composite construction. In addition, the present invention is directed to a method for producing rotary tools and rotary tool blanks having a composite construction. The method of the present invention finds general application in the production of rotary tools and may be applied in, for example, the production of cemented carbide rotary tools used in material removal operations such as drilling, reaming, countersinking, counterboring, and end milling.

DESCRIPTION OF THE INVENTION BACKGROUND

Cemented carbide rotary tools (i.e., tools driven to rotate) are commonly employed in machining operations such as, for example, drilling, reaming, countersinking, counterboring, end milling, and tapping. Such tools are conventionally of a solid monolithic construction. The manufacturing process for such tools involves consolidating metallurgical powder (comprised of particulate ceramic and binder metal) to form a compact. The compact is then sintered to form a cylindrical tool blank having a solid monolithic construction. As used herein, monolithic construction means that the tools are composed of a material, such as, for example, a cemented carbide material, having substantially the same characteristics at any working volume within the tool. Subsequent to sintering, the tool blank is appropriately machined to form the cutting edge and other features of the particular geometry of the rotary tool. Rotary tools include, for example, drills, end mills, reamers, and taps.

Rotary tools composed of cemented carbides are adapted to many industrial applications, including the cutting and shaping of materials of construction such as metals, wood, and plastics. Cemented carbide tools are industrially important because of the combination of tensile strength, wear resistance, and toughness that is characteristic of these materials. Cemented carbides materials comprise at least two phases: at least one hard ceramic component and a softer matrix of metallic binder. The hard ceramic component may be, for example, carbides of elements within groups IVB through VIB of the periodic table. A common example is tungsten carbide. The binder may be a metal or metal alloy, typically cobalt, nickel, iron or alloys of these metals. The binder "cements" the ceramic component within a matrix interconnected in three dimensions. Cemented carbides may be fabricated by consolidating a metallurgical powder blend of at least one powdered ceramic component and at least one powdered binder.

The physical and chemical properties of cemented carbide materials depend in part on the individual components of the metallurgical powders used to produce the material. The properties of the cemented carbide materials are determined by, for example, the chemical composition of the ceramic component, the particle size of the ceramic component, the chemical composition of the binder, and the ratio of binder to ceramic component. By varying the components of the metallurgical powder, rotary tools such as drills and end mills can be produced with unique properties matched to specific applications.

The monolithic construction of rotary tools inherently limits their performance and range of application. As an example, FIG. 1 depicts side and end views of a twist drill 10 having a typical design used for creating and finishing holes in construction materials such as wood, metals, and plastics. The twist drill 10 includes a chisel edge 11, which makes the initial cut into the workpiece. The cutting tip 14 of the drill 10 follows the chisel edge 11 and removes most of the material as the hole is being drilled. The outer periphery 16 of the cutting tip 14 finishes the hole. During the cutting process, cutting speeds vary significantly from the center of the drill to the drill's outer periphery. This phenomenon is shown in FIG. 2, which graphically compares cutting speeds at an inner (D1), outer (D3), and intermediate (D2) diameter on the cutting tip of a typical twist drill. In FIG. 2(b), the outer diameter (D3) is 1.00 inch and diameters D1 and D2 are 0.25 and 0.50 inch, respectively. FIG. 2(a) shows the cutting speeds at the three different diameters when the twist drill operates at 200 revolutions per minute. As illustrated in FIGS. 2(a) and (b), the cutting speeds measured at various points on the cutting edges of rotary tools will increase with the distance from the axis of rotation of the tools.

Because of these variations in cutting speed, drills and other rotary tools having a monolithic construction will not experience uniform wear and/or chipping and cracking of the tool's cutting edges at different points ranging from the center to the outside edge of the tool's cutting surface. Also, in drilling casehardened materials, the chisel edge is typically used to penetrate the case, while the remainder of the drill body removes material from the casehardened material's softer core. Therefore, the chisel edge of conventional drills of monolithic construction used in that application will wear at a much faster rate than the remainder of the cutting edge, resulting in a relatively short service life for such drills. In both instances, because of the monolithic construction of conventional cemented carbide drills, frequent regrinding of the cutting edge is necessary, thus placing a significant limitation on the service life of the bit. Frequent regrinding and tool changes also result in excessive downtime for the machine tool that is being used.

Other rotary tool types of a monolithic construction suffer from similar deficiencies. For example, specially designed drill bits often are used for performing multiple operations simultaneously. Examples of such drills include step drills and subland drills. Step drills are produced by grinding one or more steps on the diameter of the drill. Such drills are used for drilling holes of multiple diameters. Subland drills may be used to perform multiple operations such as drilling, countersinking, and/or counterboring. As with regular twist drills, the service life of step and subland drills of a conventional monolithic cemented carbide construction may be severely limited because of the vast differences in cutting speeds experienced at the drills' different diameters.

The limitations of monolithic rotary tools are also exemplified in end mills. In general, end milling is considered an inefficient metal removal technique because the end of the cutter is not supported, and the length-to-diameter ratio of end mills is usually large (usually greater than 2: 1). This causes excessive bending of the end mill and places a severe limitation on the depths of cut and feed rates that can be employed.

In order to address the problems associated with rotary tools of a monolithic construction, attempts have been made to produce rotary tools having different properties at different locations. For example, cemented carbide drills having a decarburized surface are described in U.S. Pat. Nos. 5,609,447 and 5,628,837. In the methods disclosed in those patents, carbide drills of a monolithic cemented carbide construction are heated to between 600–1100° C. in a protective environment. This method of producing hardened drills has major limitations. First, the hardened surface layer of the drills is extremely thin and may wear away fairly quickly to expose the underlying softer cemented carbide material. Second, once the drills are redressed, the hardened surface layer is completely lost. Third, the decarburization step, an additional processing step, significantly increases the cost of the finished drill.

Thus, there exists a need for drills and other rotary tools that have different characteristics at different regions of the tool. As an example, a need exists for cemented carbide drills and other rotary tools that will experience substantially even wear regardless of the position on the tool face relative to the axis of rotation of the tool. As an additional example, a need exists for stiffer end mills wherein the increased stiffness is not achieved at the expense of tensile strength and toughness.

SUMMARY OF THE INVENTION

The present invention addresses the above-described needs by providing a composite rotary tool including at least a first region and a second region. The tool may be fabricated from, for example, cemented carbide, in which case the first region of the composite rotary tool comprises a first cemented carbide material that is autogenously bonded to a second region which comprises a second cemented carbide material. As used herein, an "autogenous bond" refers to a bond that develops between regions of cemented carbide or other material without the addition of filler metal or other fusing agents. The first cemented carbide material and the second cemented carbide material differ with respect to at least one characteristic. The characteristic may be, for example, modulus of elasticity, hardness, wear resistance, fracture toughness, tensile strength, corrosion resistance, coefficient of thermal expansion, and coefficient of thermal conductivity. The regions of cemented carbide material within the tool may be coaxially disposed or otherwise arranged so as to advantageously position the regions to take advantage of their particular properties. Preferred embodiments of the composite rotary tool of the present invention include twist drills, end mills, step drills, subland drills, and taps of a composite cemented carbide construction as described herein.

Cemented carbide materials generally include a binder and at least one carbide of an element selected from, for example, the group IVB, group VB and group VIB elements. The cemented carbide materials used in the present invention preferably include 60 to 98 weight percent of carbide component. The binder of cemented carbide materials typically is a metal selected from the group consisting of cobalt, nickel, iron, or alloys of these metals. The cemented carbide materials used in the present invention preferably include 2 to 40 weight percent of binder. (All weight percent ranges provided herein are inclusive of the stated upper and lower extremes unless otherwise noted.) The properties of the cemented carbide materials used in the present invention may be tailored for specific applications by varying one or any combination of the chemical composition of the ceramic component, the grain size of the ceramic component, the chemical composition of the binder, or the ratio of the binder content to the ceramic component content.

In the present invention, one or more of the ceramic component or binder chemical composition, the ceramic component grain size, and the ratio of binder content to ceramic component content differ between the at least two regions of cemented carbide material so as to advantageously select the relative properties of the two or more regions of cemented carbide material. As an example, the hardness and wear resistance of one region of a rotary tool constructed according to the invention may be enhanced relative to another cemented carbide region. In that way, the tool may be constructed so that the regions of the cutting edge experiencing relatively high cutting speeds will wear and chip at a rate similar to that of regions experiencing lower cutting speeds. Although the present invention is presented in terms of rotary tools having a finite number of regions of cemented carbide material, it will be understood that the present invention may be applied to provide rotary tools with any number of regions of cemented carbide material, each having selected properties.

The invention also includes a novel method of producing composite rotary tools of the present invention. The method includes placing a first metallurgical powder into a first region of a void within a mold. A second metallurgical powder is placed into a second region of the void of the mold. The mold may be segregated into the two (or more) regions by, for example, placing a physical partition in the void of the mold to separate the regions. The metallurgical powders may be chosen to provide, on consolidation, cemented carbide materials having the desired properties as described above. A portion of at least the first metallurgical powder and the second metallurgical powder are placed in contact within the mold. The mold is then isostatically compressed to consolidate the metallurgical powders to form a compact. The compact is subsequently sintered to further density the compact and to form an autogenous bond between the regions. Preferably, the compact is over pressure sintered at a pressure of 300–2000 psi and at a temperature of 1350–1500° C. Subsequently, material may be removed from the sintered compact to form flutes or otherwise form a cutting edge or other features of the rotary tool.

The reader will appreciate the foregoing details and advantages of the present invention, as well as others, upon consideration of the following detailed description of embodiments of the invention. The reader also may comprehend such additional details and advantages of the present invention upon using the invention.

BRIEF DESCRIPTION OF THE DRAWINGS

The features and advantages of the present invention may be better understood by reference to the accompanying drawings in which:

FIGS. 3(a)–(d) are cross-sectional views of novel blanks useful for producing composite rotary tools constructed according to the present invention, and wherein FIG. 3(b) is a cross-sectional end view of the blank shown in perspective in FIG. 3(a);

DESCRIPTION OF EMBODIMENTS OF THE INVENTION

The present invention provides for rotary cutting tools and cutting tool blanks having a composite construction rather than the monolithic construction of conventional rotary tools. As used herein, a rotary tool is a tool having at least one cutting edge that is driven to rotate and which is brought into contact with a workpiece to remove material from the workpiece. As used herein, a rotary tool having a "composite" construction refers to one having regions differing in chemical composition and/or microstructure. These differences result in the regions differing with respect to at least one characteristic. The characteristic may be selected from, for example, hardness, tensile strength, wear resistance, fracture toughness, modulus of elasticity, corrosion resistance, coefficient of thermal expansion, and coefficient of thermal conductivity. Composite rotary tools that may be constructed as provided in the present invention include drills and end mills, as well as other tools that may be used in, for example, drilling, reaming, countersinking, counterboring, end milling, and tapping of materials.

The present invention more specifically provides a composite rotary tool having at least one cutting edge, such as a helically oriented cutting edge, and including at least two regions of cemented carbide material that are bonded together autogenously and that differ with respect to at least one characteristic. The differing characteristics may be provided by variation of at least one of the chemical composition and the microstructure among the two regions of cemented carbide material. The chemical composition of a region is a function of, for example, the chemical composition of the ceramic component and/or binder of the region and the carbide-to-binder ratio of the region. For example, one of the two autogenously bonded cemented carbide material regions of the rotary tool may exhibit greater wear resistance, enhanced hardness, and/or a greater modulus of elasticity than the other of the two regions.

Figure 3A:
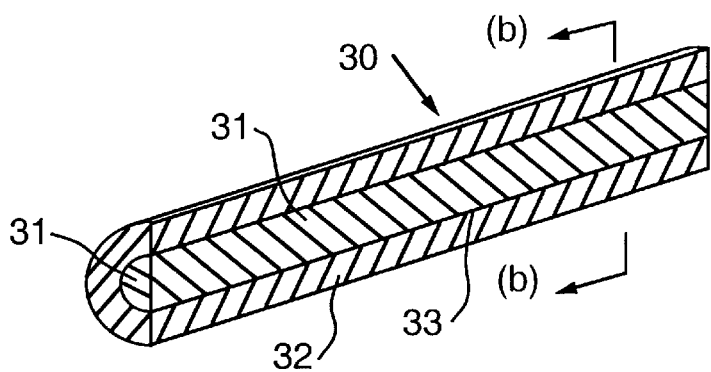
Figure 3B:
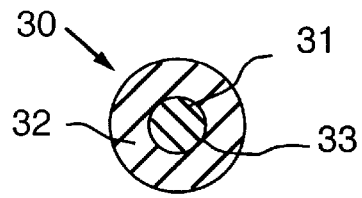

Aspects of present invention may be described in relation to the tool blank 30, shown in FIGS. 3(a) and (b) in cross-sectional views through the blank's central axis and transverse to that axis, respectively. The tool blank 30 is a generally cylindrical sintered compact with two coaxially disposed cemented carbide regions. It will be apparent to one skilled in the art, however, that the following discussion of the present invention also may be adapted to the fabrication of composite rotary tools and tool blanks having more complex geometry and/or more than two regions. Thus, the following discussion is not intended to restrict the invention, but merely to illustrate embodiments of it.

Referring again to FIGS. 3(a) and (b), the cylindrical rotary tool blank 30 is comprised of two differing cemented carbide layers, a core region 31 and an outer region 32. The core region 31 and the outer region 32 are both of a cemented carbide material including ceramic particles in a continuous matrix of binder. Preferably, the cemented carbide materials in the core region 31 and in the outer region 32 include a ceramic component composed of carbides of one or more elements belonging to groups IVB through VIB of the periodic table. The ceramic component preferably comprises about 60 to about 98 weight percent of the total weight of the cemented carbide material in each region. The carbide particles are embedded within a matrix of binder material that preferably constitutes about 2 to about 40 weight percent of the total material in each region. The binder preferably is one or more of Co, Ni, Fe, and alloys of these elements. The binder also may contain, for example, elements such as W, Cr, Ti, Ta, V, Mo, Nb, Zr, Hf, and C up to the solubility limits of these elements in the binder. Additionally, the binder may contain up to 5 weight percent of elements such as Cu, Mn, Ag, Al, and Ru. One skilled in the art will recognize that any or all of the constituents of the cemented carbide material may be introduced in elemental form, as compounds, and/or as master alloys.

Again referring to FIGS. 3(a) and (b), the core region 31 of the tool blank 30 is autogenously bonded to the outer region 32 at an interface 33. The interface 33 is shown in FIGS. 3(a) and (b) to be cylindrical, but it will be understood that the shapes of the interfaces of cemented carbide material regions of the composite rotary tools of the present invention are not limited to cylindrical configurations. The autogenous bond between the regions at the interface 33 may be formed by, for example, a matrix of binder that extends in three dimensions from the core region 31 to the outer region 32, or vice versa. The ratio of binder to ceramic component in the two regions may be the same or different and may be varied between the regions to affect the regions' relative characteristics. By way of example only, the ratio of binder to ceramic component in the adjacent regions of the composite tool blank 30 may differ by 1 to 10 weight percent. The characteristics of the cemented carbide materials in the different regions of the composite rotary tools of the present invention may be tailored to particular applications.

One skilled in the art, after having considered the description of present invention, will understand that the improved rotary tool of this invention could be constructed with several layers of different cemented carbide materials to produce a progression of the magnitude of one or more characteristics from a central region of the tool to its periphery. Thus, for example, a twist drill may be provided with multiple, coaxially disposed regions of cemented carbide material and wherein each such region has successively greater hardness and/or wear resistance than the adjacent, more centrally disposed region. Alternately, rotary tools of the present invention could be made with other composite configurations wherein differences in a particular characteristic occur at different regions of the tool. Examples of alternate configurations are shown in FIGS. 3(c) and 3(d).

Figure 3C:
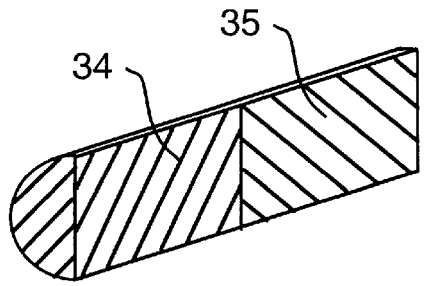

FIG. 3(c) represents an embodiment of the present invention that is particularly useful as a cylindrical blank from which drills used for drilling case hardened materials may be produced. For drilling casehardened materials, the drill tip is typically used to penetrate the case, while the body of the drill removes material from the softer core. In this embodiment, the first region 34 and the second region 35 are disposed at first and second ends of the blank. The first end would become a tip end of the drill, and the second end would become the end that would be secured in the chuck of the machine tool. The first region 34 may be composed of a hard and wear resistant material such as, for example; a cemented carbide of tungsten carbide particles (0.3 to 1.5 $\mu$m average grain size) in a cobalt alloy binder comprising approximately 6 to 15 weight percent of the material in the first region 34. The second region 35 may be composed of, for example, tungsten carbide particles (1.0 to 10 $\mu$m average grain size) in a cobalt alloy binder comprising approximately 2 to 6 weight percent of the material in second region 35. The first region 34 is autogenously bonded to the second region 35. The second region 35 has an enhanced modulus of elasticity relative to the first region 34 so as to resist flexing when pressure is applied to the drill.

Figure 3D:
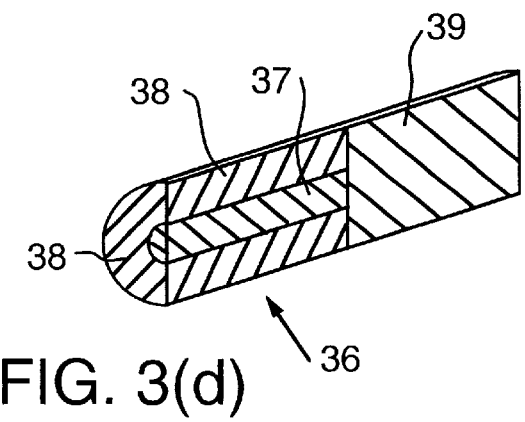

The embodiment shown in FIG. 3(d) combines features of the embodiments of FIGS. 3(a) and 3(c). The cutting tip 36 includes two regions of different grades of cemented carbide material, a core region 37 and an outer region 38. The core and outer regions 37 and 38 are coaxially disposed and autogenously bonded to a third region 39. Regions 37 and 38 may be compositionally similar to regions 31 and 32 of the embodiment of FIGS. 3(a) and (b) or may be of other grades of cemented carbides so that the outer region 38 has enhanced hardness and wear resistance relative to the core region 37.

A major advantage of the composite cemented carbide rotary tools of the present invention is the flexibility available to tailor properties of regions of the tools to suit different applications. For example, the thickness, geometry, and/or physical properties of the individual cemented carbide material regions of a particular composite blank of the present invention may be selected to suit the specific application of the rotary tool fabricated from the blank. Thus, for example, the stiffness of one or more cemented carbide regions of the rotary tool experiencing significant bending during use may be of a cemented carbide material having an enhanced modulus of elasticity; the hardness and/or wear resistance of one or more cemented carbide regions having cutting surfaces and that experience cutting speeds greater than other regions may be increased; and/or the corrosion resistance of regions of cemented carbide material subject to chemical contact during use may be enhanced.

Composite rotary tools of the present invention may be made by any suitable process known in the art, but preferably are made using a dry bag isostatic method as further described below. The dry bag process is particularly suitable because it allows the fabrication of composite rotary tools and tool blanks with many different configurations, examples of which have been provided in FIGS. 3(a)–(d). The configurations shown in FIGS. 3(c) and (d) would be extremely difficult, if not impossible, to produce using other powder consolidation techniques such as die compaction, extrusion, and wet bag isostatic pressing.

Figure 4:
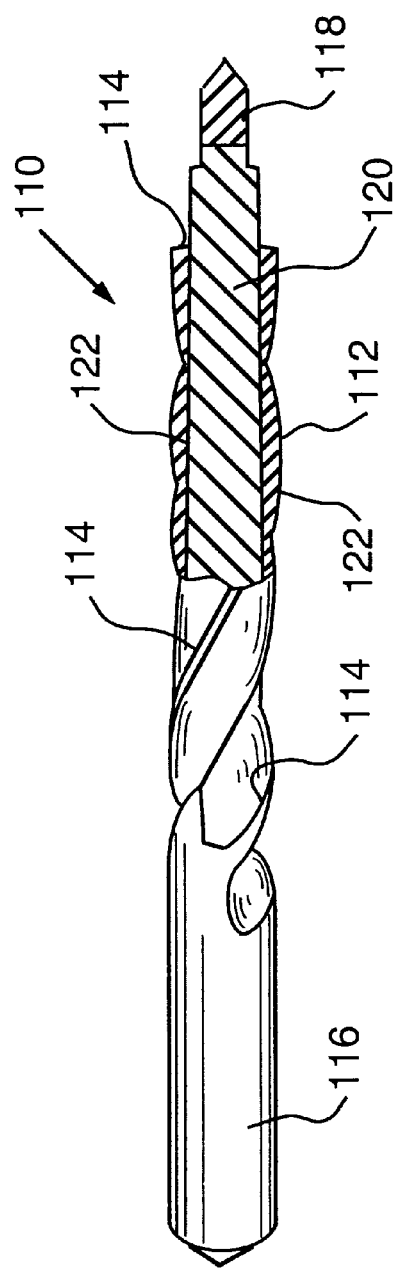
FIG. 4 is a partial cut-away plan view of an embodiment of a step drill constructed according to the present invention.
Figure 5:
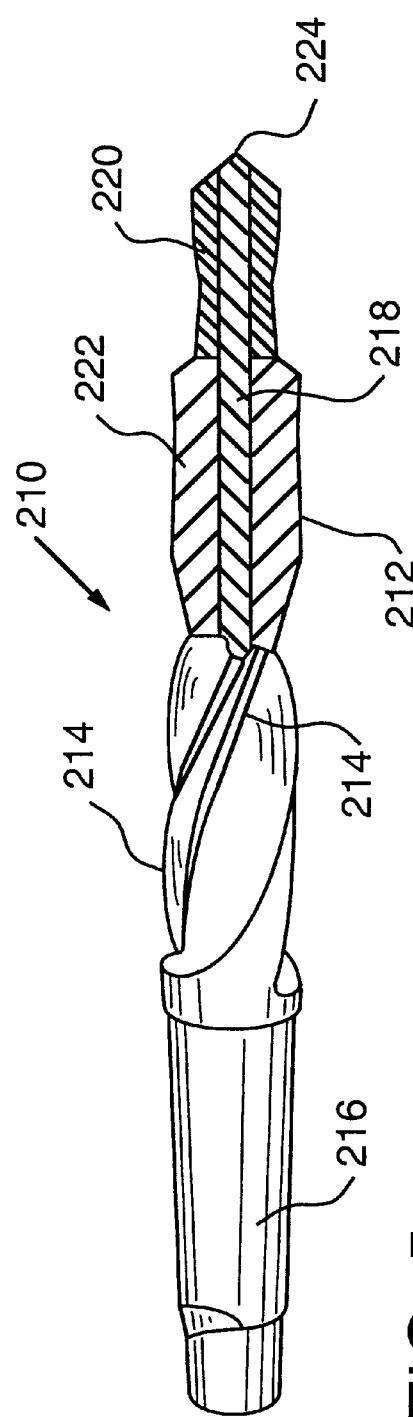
FIG. 5 is a partial cut-away plan view of an embodiment of a subland drill constructed according to the present invention.

By way of example only, additional embodiments of rotary tools of the present invention are shown in FIGS. 4 and 5. FIG. 4 depicts a step drill 110 constructed according to the present invention. The drill 110 includes a cutting portion 112 including several helically oriented cutting edges 114. The drill 110 also includes a mounting portion 116 that is received by a chuck to mount the drill to a machine tool (not shown). The drill 110 is shown in partial cross-section to reveal three regions of cemented carbide materials that differ relative to one another with regard to at least one characteristic. A first region 118 is disposed at the cutting tip of the drill 110. The cemented carbide material from which region 118 is composed exhibits an enhanced wear resistance and hardness relative to a central region 120 forming the core of the drill 110. The core region is of a cemented carbide material that exhibits an enhanced modulus of elasticity relative to the remaining two regions. The enhanced modulus of elasticity reduces the tendency of the drill 110 to bend as it is forced into contact with a work piece. The drill also includes an outer region 122 that defines the several helically oriented cutting edges 114. The outer region surrounds and is coaxially disposed relative to the core region 120. The outer region 122 is composed of a cemented carbide material that exhibits enhanced hardness and wear resistance relative to both the core region 120 and the tip region 118. The cutting surfaces 114 that are defined by the outer region 122 experience faster cutting speeds than cutting regions proximate to the drill's central axis. Thus, the enhanced wear resistance and hardness of the outer region 122 may be selected so that uniformity of wear of the cutting surfaces is achieved.

By way of example only, FIG. 5 illustrates a subland drill 210 constructed according to the present invention. As with FIG. 4, FIG. 5 depicts the subland drill 210 in partial cross-section through the drill's central axis to expose three regions of different cemented carbide materials. As is discussed above, the different regions of cemented carbide material may differ in one or more of, for example, the chemical composition of the carbide component or binder component, the grain size of the carbide component, or the ratio of carbide component to binder in the material. The subland drill 210 includes a cutting portion 212 including a plurality of helically oriented cutting edges 214. The drill 210 also includes a mounting portion 216. A core region 218 of the drill, 210 is composed of a cemented carbide material having an enhanced modulus of elasticity relative to the remaining two regions drill 210 exposed in cross-section. As with step drill 110, the core region 218 of subland drill 210 inhibits bending of the drill 210 upon application of pressure during drilling operations. A tip region 220 is composed of a cemented carbide material having an enhanced wear resistance and hardness relative to the core region 218. The advantages discussed with respect to drill 110 are thereby achieved. The embodiment of FIG. 5, however, differs from the embodiment of FIG. 4 in that the core region 218 extends to the terminus 224 of the drill 210 and is coaxially disposed and surrounded by the tip region 220. The coaxial relationship of the core and tip regions 218 and 220, respectively, inhibits bending of the drill 210 in that portion of the cutting tip 212 adjacent terminus 224.

The present invention also includes methods of producing the composite rotary tools of the present invention and composite blanks used to produce those tools. One such method includes placing a first metallurgical powder into a void of a first region of a mold. Preferably, the mold is a dry-bag rubber mold. A second metallurgical powder is placed into a second region of the void of the mold. Depending on the number of regions of different cemented carbide materials desired in the rotary tool, the mold may be partitioned into additional regions in which particular metallurgical powders are disposed. The mold may be segregated into regions by placing a physical partition in the void of the mold to define the several regions. The metallurgical powders are chosen to achieve the desired properties of the corresponding regions of the rotary tool as described above. A portion of at least the first region and the second region are brought into contact with each other, and the mold is then isostatically compressed to densify the metallurgical powders to form a compact of consolidated powders. The compact is then sintered to further densify the compact and to form an autogenous bond between the first and second, and, if present, other regions. The sintered compact provides a blank that may be machined to include a cutting edge and/or other physical features of the geometry of a particular rotary tool. Such features are known to those of ordinary skill in the art and are not specifically described herein.

Actual examples of application of the foregoing method to provide composite rotary tools according to the present invention follow.

EXAMPLE 1

The present example applies the method of the present invention to manufacture a novel composite cemented carbide end mill improving upon the performance of conventional end mills of a monolithic construction. As is known, conventional end milling is a relatively inefficient metal removal technique because the end of the tool is not supported, and the tool's length-to-diameter ratio is typically large. This can result in excessive bending of the end mill and, therefore, low depths of cut, feed rates, and cutting speeds are usually employed. A composite end mill constructed according to the present invention may include a relatively stiff inner core region with a high modulus of elasticity to resist bending, and a relatively strong and tough outer region suitable for end milling applications.

In the present example, the end mill was provided with two coaxially disposed regions. The inner core region exhibits a high modulus of elasticity and, therefore, Teledyne (Lavergne, Tennessee) grade HCA cemented carbide material was chosen as the material from which the core region is composed. In general, a cemented carbide having a lower binder content will have a high elastic modulus. Teledyne grade HCA contains 5.5 weight percent cobalt binder, tungsten carbide as the ceramic component, a medium grain structure, a hardness of 92.4 HRA, and a modulus of elasticity of approximately $91 \times 10^6$ psi (635 kN/mm$^2$). Teledyne grade H-91 was chosen as the material for the outer region (working surface). In general, grades suitable for milling must possess tensile strength and toughness to withstand the forces encountered during interrupteded cutting. Teledyne grade H-91 has been found to be particularly suitable in many milling applications. Grade H-91 contains 11.0 weight percent cobalt binder, tungsten carbide as the ceramic component, a medium grain structure, a hardness of 89.7 HRA, and a modulus of elasticity of approximately $82 \times 10^6$ psi (575 kN/mm$^2$).

Figure 6:
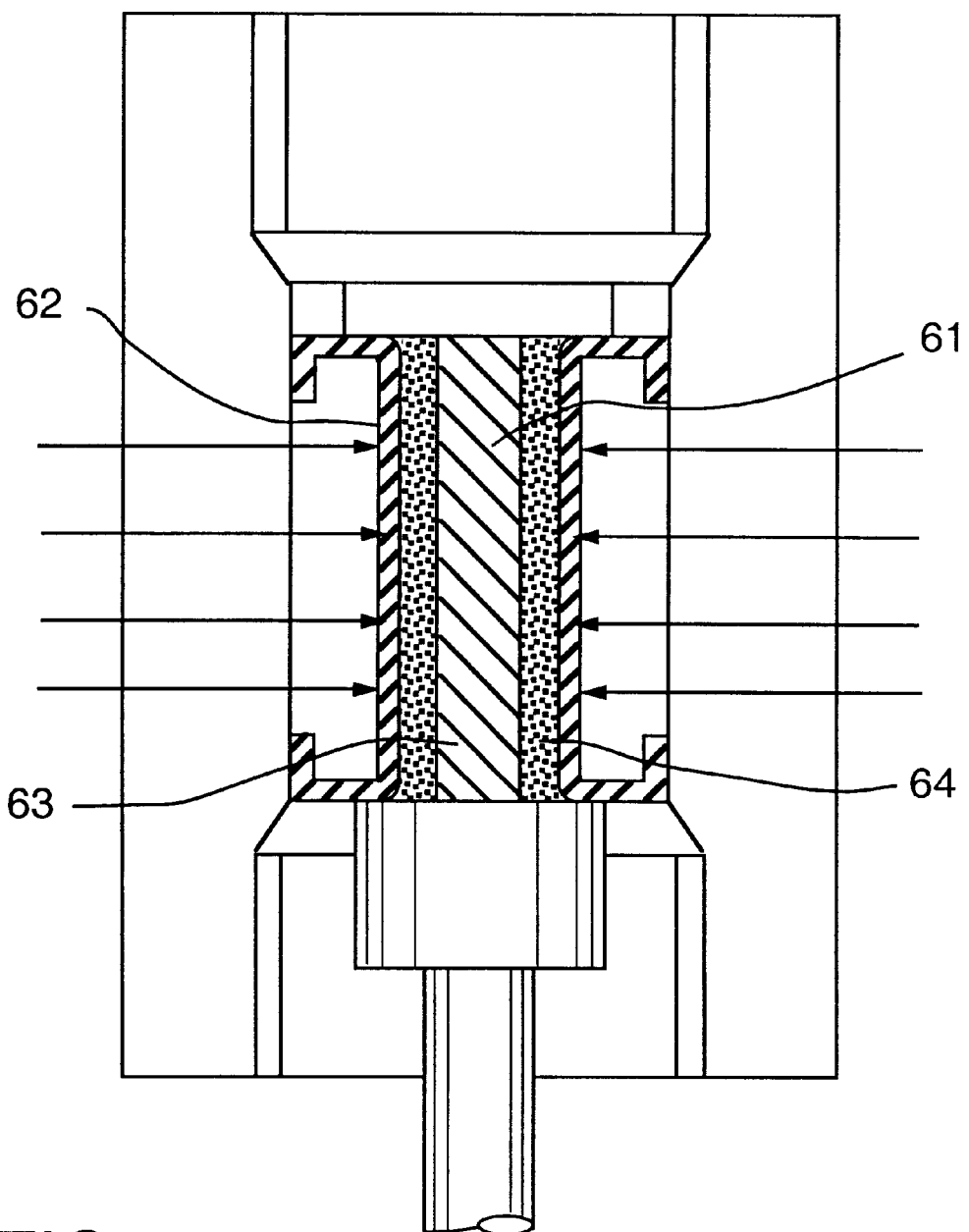
FIG. 6 is a representation of the dry-bag isostatic pressing apparatus used in Example 1 to produce a composite end mill within the present invention.

The end mill of the present example was produced from metallurgical powders using a dry-bag isostatic pressing apparatus as schematically depicted in FIG. 6. The construction and manner of operation of a dry-bag isostatic press is known to those of ordinary skill in the art and, therefore, are not described in detail herein. As shown in FIG. 6, a cylindrical sleeve in the form of a thin walled stainless steel tube 61 was inserted into a dry-bag isostatic mold 62. The inner region 63 of the tube 61 was filled with the first metallurgical powder to form the inner core region of the end mill (grade HCA cemented carbide material). The region 64 exterior to the tube 61 was filled with the second metallurgical powder to form the outer region of the end mill (grade H-91 cemented carbide material). The tube 61 was then removed from the mold 62 so that the first metallurgical powder and the second metallurgical powder came into contact. The powders were pressed in the mold at a pressure of about 30,000 psi to form an approximately 14 inch long composite compact of two different cemented carbide grades. The compact was then over-pressure sintered in a sinter-HIP vacuum furnace (manufactured by AVS, Inc., Ayer, Massachusetts) at 1400° C. and a pressure of approximately 800 psi. In the process of over-pressure sintering, also known as sinter-HIP, the chamber containing the compact is first heated to sintering temperature and is then pressurized. Compared with conventional HIP, sinter-HIP utilizes lower pressures and higher temperatures, is more cost effective, and produces a more uniform microstructure, all without sacrificing the reliability of the resulting component. The construction and manner of operation of a sinter-HIP vacuum furnace are known to those of ordinary skill in the art and, therefore, are not described in detail herein. Subsequent to completion of the over pressure sintering, the densified compact was suitably machined to form the cutting edges and other surface features of the end mill.

Figure 7:
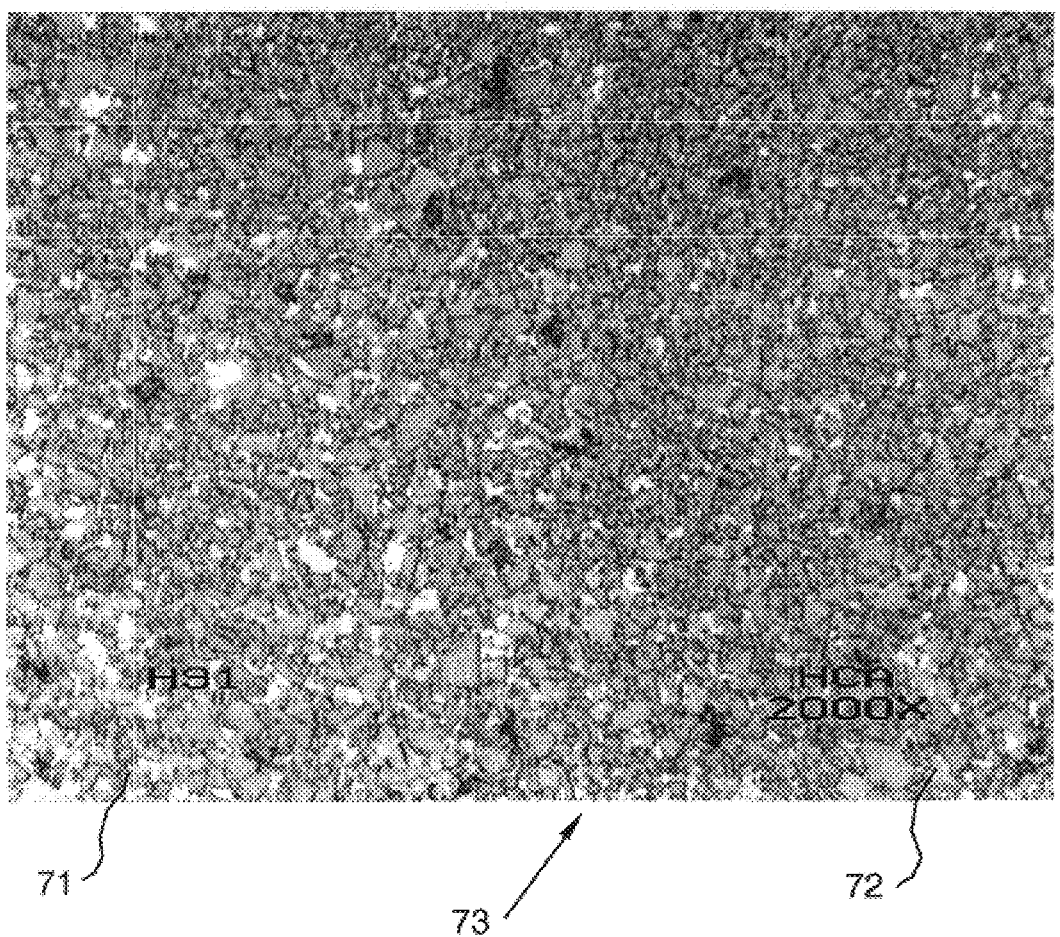
FIG. 7 is a photomicrograph taken at a magnification of 2000× of a region of interface between first and second regions of cemented carbide material in an end mill of the present invention fabricated in Example 1.

FIG. 7 is a photomicrograph at a magnification of 2000× of a region of the rotary tool manufactured as described in this example in the vicinity of the interface 73 between the first region 71 of cemented carbide material (grade HCA) and the second region 72 of cemented carbide material (grade H-91). The autogenous bond at interface 73 can be seen in the photomicrograph as a transition between the first region 71, which has a high ratio of binder to ceramic component relative to the second region 72. The photomicrograph shows that the depicted interface region lacks voids and inclusions.

EXAMPLE 2

Figures 1A, 1B:
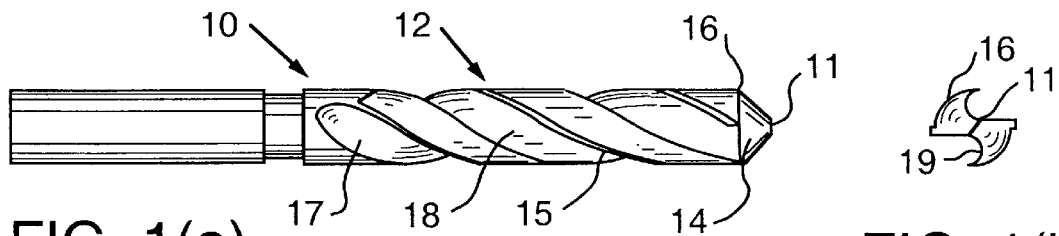
FIGS. 1(a) and 1(b) are plan and on-end views, respectively, of a conventional twist drill.
Figure 2B:
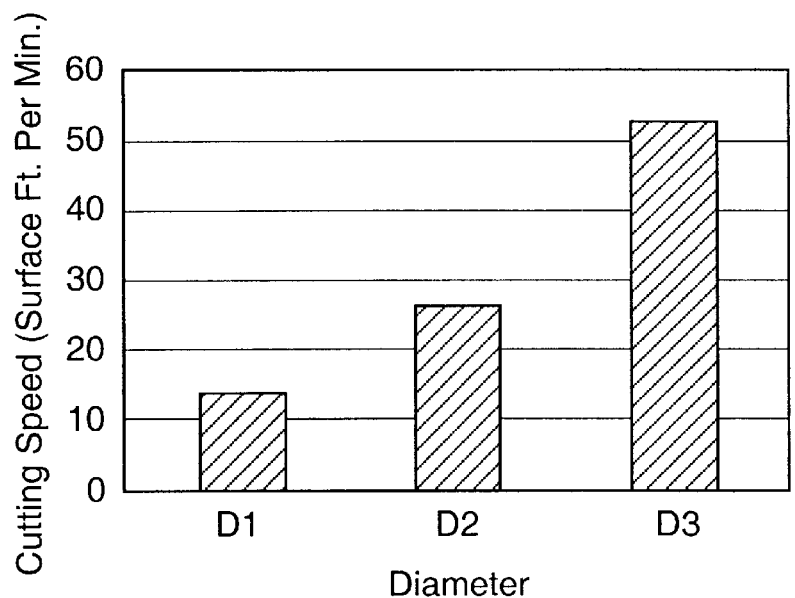
FIG. 2(a) is a graph indicating cutting speeds at the three diameters D1, D2, and D3 of a conventional twist drill indicated in FIG. 2(b)
Figure 2A:
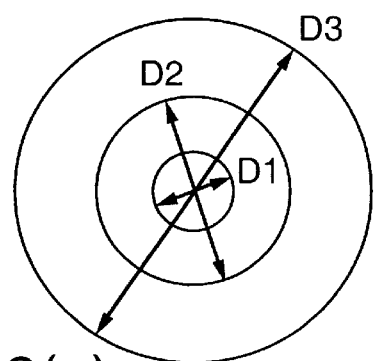

The present example applies the method of the present invention to manufacture a novel composite cemented carbide drill improving upon the performance of conventional drills of a monolithic construction. As shown in FIG. 1, the initial cut into the workpiece is made by the drill's chisel edge at a relatively small diameter on the drill's cutting edge. Also, as shown in FIGS. 2(a) and (b), the cutting speed is much slower at smaller diameters on the cutting edge. The inner core of the drill is thus expected to remove the bulk of the material at slow speeds (rough cutting) while the outer diameters of the cutting edge perform the finish cutting. This can result in the excessive build-up of heat in the center of the drill, resulting in premature thermal cracking. In addition, the core region can be expected to chip and fracture at a faster rate compared with the outer region. In order to obtain uniform chipping and wear, it is thus advantageous to have slightly softer and tougher (and hence resistant to chipping and thermal cracking) core. Thus, a composite drill constructed according to the present invention may include a relatively soft and tough inner region and a relatively hard and wear resistant outer region.

In the present example, the drill includes two coaxially disposed regions. The inner core region exhibits high toughness and, therefore, Teledyne grade FR-15 cemented carbide material was chosen as the material of the core region. In general, a cemented carbide having a high binder content will have a high toughness and resistance to chipping and thermal cracking. Teledyne grade FR-15 has been found to be particularly suitable for rough drilling applications. Grade FR-15 contains 15 weight percent cobalt binder, a tungsten carbide ceramic component, a fine grain structure average grain size approximately 0.8 micron), and a hardness of 90.2 HRA. Teledyne grade FR-10 was chosen as the material for the outer region. Grade FR-10 has been found particularly suitable in high speed drilling applications. It contains 10 weight percent cobalt binder, a tungsten carbide ceramic component, a fine grain structure (average grain size 0.8 micron), and a hardness of 91.9 HRA.

As in Example 1, the drill of Example 2 was produced from metallurgical powders using a dry-bag isostatic pressing apparatus as schematically depicted in FIG. 6. A partition in the form of a stainless steel tube 61 was inserted into dry-bag isostatic mold 62. The inner region of the tube 61 was filled with grade FR-15 powder to form the inner core region of the drill. The region 64 exterior to the tube 61 was filled with grade FR-10 powder to form the outer region of the drill. The tube 61 was then removed from the mold 62 so that the two powder grades came into contact. The powders were pressed at a pressure of about 30,000 psi to form a composite compact approximately 14 inches long. The compact was then over pressure sintered as in Example 1, and subsequently machined to form the cutting edge and other surface features of drill.

Figure 8:
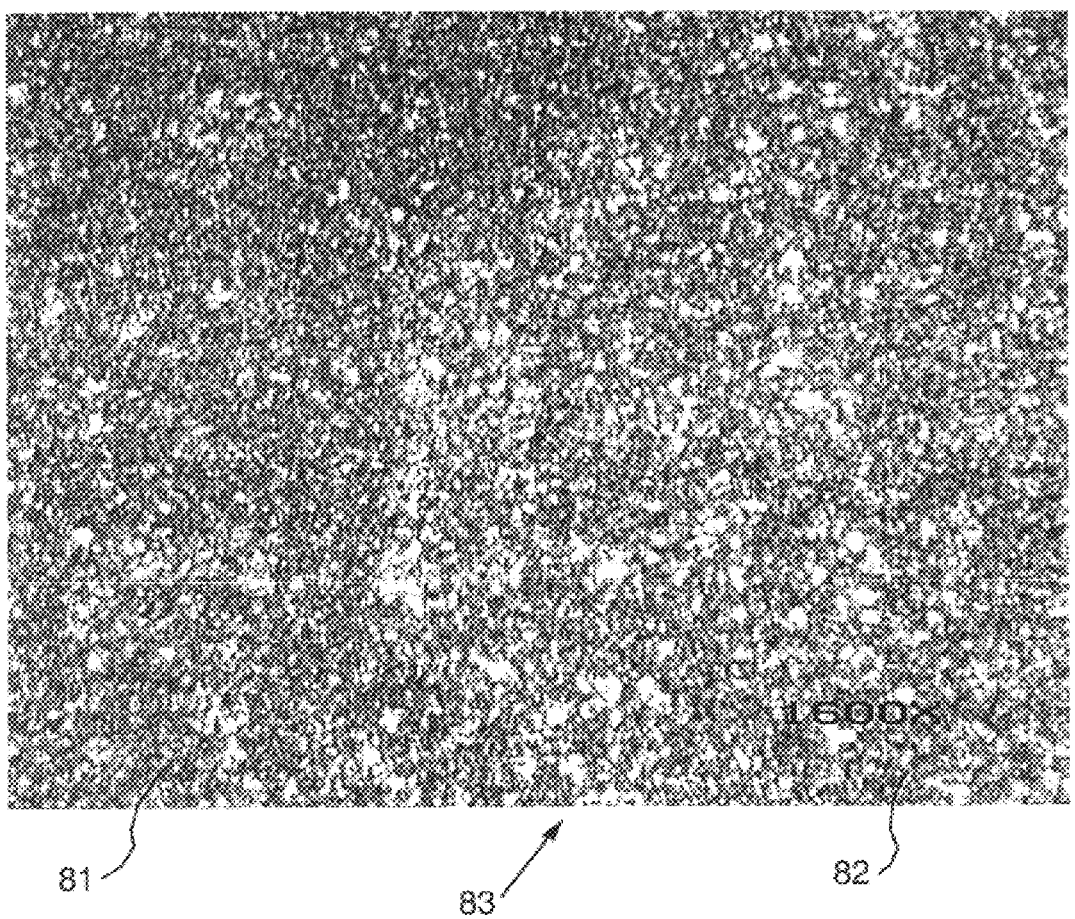
FIG. 8 is a photomicrograph taken at a magnification of 1600× of a region of interface between first and second regions of cemented carbide material in an article according to the present invention fabricated in Example 2.

FIG. 8 is a photomicrograph at a magnification of 1600× of a region of the drill manufactured as described in this example in the vicinity of the interface 83 between the first region 81 of cemented carbide material (grade FR-15) and the second region 82 of cemented carbide material (grade FR-10). The autogenous bond at interface 83 can be seen in the photomicrograph as a transition between the first region 81, which has a high ratio of binder to ceramic component relative to the second region 82. The photomicrograph shown that the depicted interface region lacks voids and inclusions.

EXAMPLE 3

The rotary tools in Examples 1 and 2 included regions of cemented carbide grades differing in cobalt binder content. The tungsten carbide grain sizes in the regions, however, were approximately the same. In the present example, a rotary tool blank in the form of a composite rod was provided by combining cemented carbide grades differing in binder content and average tungsten carbide grain size. A first region of the composite rod was composed of Teledyne grade H-17, which has a fine carbide grain structure. (Grade H-17 has an average grain size of approximately 0.8 microns, a cobalt content of 10.0 weight percent, and a hardness of 91.7 HRA.) A second region of the composite rod was composed of Teledyne grade R-61, which has a coarse carbide grain structure. (Grade R-61 has an average grain size of approximately 4.0 microns, a cobalt content of 15.0 weight percent, and a hardness of 86.0 HRA.) The composite rod was fabricated by substantially the same methods as used in Examples 1 and 2.

Figure 9:
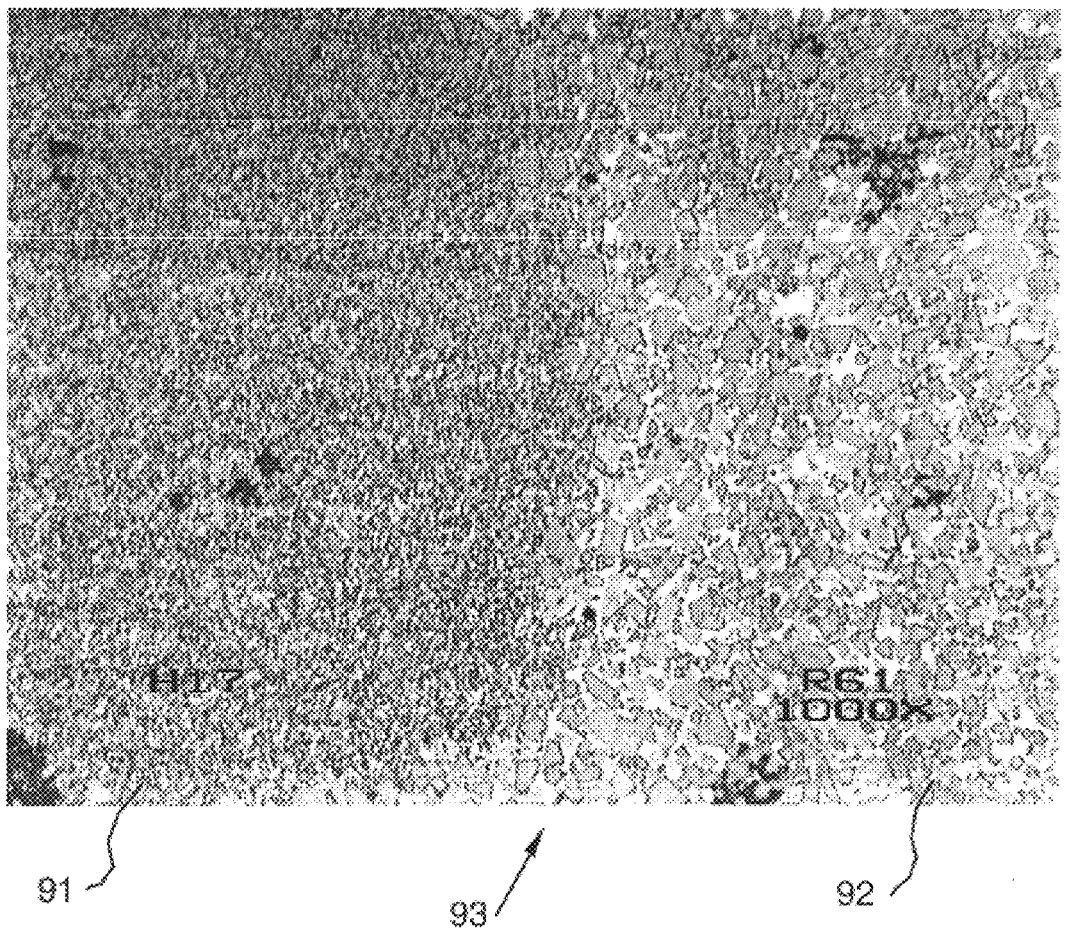
FIG. 9 is a photomicrograph taken at a magnification of 1000× of a region of interface between first and second regions of cemented carbide material in a composite rod fabricated according to the present invention in Example 3.

FIG. 9 is a photomicrograph at a magnification of 1000× of a region of the composite rod of this example in the vicinity of the interface 93 between the first region 91 (grade H-17) and the second region 92 (grade R-61). The autogenous bond at interface 93 can be seen in FIG. 9 as a transition between the two regions. This example further illustrates the great flexibility available using the process of the present invention to tailor the characteristics of different regions of the rotary tools of the invention to match specific applications.

Although the present invention has been described in connection with certain embodiments, those of ordinary skill in the art will, upon considering the foregoing description, recognize that many modifications and variations of the invention may be employed. All such variations and modifications of the present invention are intended to be covered by the foregoing description and the following claims.

We claim:

1. A composite rotary tool comprising:
    an elongate portion including at least coaxially disposed core and a outer regions, said outer region of said elongate portion defining a helically oriented cutting edge;
    said core region comprising a first cemented carbide material;
    said outer region comprising a second cemented carbide material differing from said first cemented carbide material in at least one characteristic, wherein said outer region comprises less than 5% cubic carbides by weight;
    said core region autogenously bonded to said outer region.

2. The composite rotary tool of claim 1 wherein said characteristic is at least one selected from the group consisting of modulus of elasticity, hardness, wear resistance, fracture toughness, tensile strength, corrosion resistance, coefficient of thermal expansion, and coefficient of thermal conductivity.

3. The composite rotary tool of claim 1, wherein said first cemented carbide material and said second cemented carbide material individually comprise a binder and a metal carbide.

4. The composite rotary tool of claim 3, wherein said metal of said metal carbide of said first cemented carbide material and said metal of said metal carbide of second carbide material are individually selected from the group consisting of group IVB, group VB and group VIB elements.

5. The composite rotary tool of claim 3, wherein said core region is autogenously bonded to said outer region by a matrix of said binder of at least one of said first cemented carbide material and said second carbide material.

6. The composite rotary tool of claim 3, wherein said binder of said first cemented carbide material and said binder of said second cemented carbide material each individually comprise a metal selected from the group consisting of cobalt, cobalt alloy, nickel, nickel alloy, iron, and iron alloy.

7. The composite rotary tool of claim 3, herein said binder of said first cemented carbide material and said binder of said second cemented carbide material differ in chemical composition.

8. The composite rotary tool of claim 3, wherein the weight percentage of said binder of said first cemented carbide material differs from the weight percentage of said binder of said second cemented carbide material.

9. The composite rotary tool of claim 3, wherein said metal carbide of said first cemented carbide material differs from said metal carbide of said second cemented carbide material in at least one of chemical composition and average grain size.

10. The composite rotary tool of claim 3, wherein said first cemented carbide material and said second cemented carbide material each comprises 2 to 40 weight percent of said binder and 60 to 98 weight percent of said metal carbide.

11. The composite rotary tool of claim 11, wherein one of said first cemented carbide material and said second carbide material includes 1 to 10 weight percent more of said binder than the other of said first cemented carbide material and said second cemented carbide material.

12. The composite rotary tool of claim 1, wherein the composite rotary tool is one of a drill, an end mill, and a tap.

13. The composite rotary tool of claim 1, wherein the modulus of elasticity of said first cemented carbide material within said core region differs from the modulus of elasticity of said second cemented carbide material within said outer region.

14. The composite rotary tool of claim 1, wherein the modulus of elasticity of said first cemented carbide material within said core region is $90 \times 10^6$ to $95 \times 10^6$ psi and the modulus of elasticity of said second cemented carbide material within said outer region is $69 \times 10^6$ to $92 \times 10^6$ psi.

15. The composite rotary tool of claim 1, wherein at least one of the hardness and wear resistance of said first cemented carbide material within said core region differs from the said second cemented carbide material within said outer region.

16. A composite rotary tool comprising:
    an elongate portion including at least a first region and a second region, said elongate portion defining at least one helically oriented cutting edge;
    said first region comprising a first cemented carbide material;
    said second region comprising a second cemented carbide material differing from said first region in at least one of modulus of elasticity, hardness, wear resistance, fracture toughness, tensile strength, corrosion resistance, coefficient of thermal expansion, and coefficient of thermal conductivity, wherein said second region comprises less than 5% cubic carbides by weight;
    said first region autogenously bonded to said second region; and
    said first region and said second region coaxially disposed with said second region surrounding at least a portion of said first region, said helically oriented cutting edge defined by said second region.

17. The composite rotary tool of claim 16 wherein the tool is one of a drill, an end mill, and a tap.

18. An endmill or drill bit comprising:
    an elongate portion comprising coaxially disposed core and outer regions, said elongate portion defining a helically oriented cutting edge;
    said core region comprising a first cemented carbide material having a modulus of elasticity from $90 \times (10)^6$ psi to $95 \times (10)^6$ psi;
    said outer region comprising a second cemented carbide material having a different modulus elasticity from $69 \times (10)^6$ psi to $92 \times (10)^6$ psi; and
    said core region autogenously bonded to said outer region.

19. The endmill or drill bit of claim 18, wherein said first cemented carbide material comprises, by weight, 2 to 6% cobalt and said second cemented carbide material comprises, by weight, 6 to 15% cobalt.

20. An endmill or drill bit comprising:
    an elongate portion comprising coaxially disposed core and outer regions, said elongate portion defining a helically oriented cutting edge;
    said core region comprising a first cemented carbide material comprising, by weight, 0.2 to 0.6% chromium;
    a said outer region comprising a second cemented carbide material differing from said first cemented carbide material in at least one characteristic, wherein said outer region comprises less than 5% cubic carbides; and
    said core region autogenously bonded to said outer region.

21. The endmill or drill bit of claim 20, wherein said first cemented carbide material further comprises, by weight, 0.2 to 0.6% chromium, 0.1 to 0.3% vanadium carbide and 8 to 17% cobalt, tungsten carbide and incidental impurities.

22. The endmill or drill bit of claim 21, wherein said second cemented carbide material comprises, by weight, 0.2 to 0.6% chromium, 0.1 to 0.3% vanadium carbide, and 5 to 20% cobalt, tungsten carbide and incidental impurities.

23. A composite rotary tool comprising:
    an elongate core region, said core region comprising a core cemented carbide material;
    a first region comprising a first cemented carbide material different than said core cemented carbide material in at least one characteristic and defining a first helically oriented cutting edge, said first region coaxially disposed to said core region;
    a second region comprising a second cemented carbide material differing from said first cemented carbide material and said core cemented carbide material in at least one characteristic and said second region defining a second helically oriented cutting edge different in at least one dimension than said first helically oriented cutting edge;
    said first region and second region autogenously bonded to said core region.

24. The composite rotary tool of claim 23, wherein the second helically oriented cutting edge has a greater diameter than the first helically oriented cutting edge.

25. The composite rotary tool of claim 24, wherein the composite rotary tool is a subland drill or a step drill.

26. The composite rotary tool of claim 23, wherein the core region has a greater modulus of elasticity than the first region.

27. The composite rotary tool of claim 23, wherein the cemented carbide materials each comprise a binder and a metal carbide.

28. The composite rotary tool of claim 27, wherein the metal of said metal carbide of the core cemented carbide material, the first cemented carbide material and the second cemented carbide material are each individually selected from the group consisting of group IVB, group VB and group VIB elements.

29. The composite rotary tool of claim 27, wherein the binder of the core cemented carbide material, the first cemented carbide material and the second cemented carbide material are each individually selected from the group consisting of cobalt, cobalt alloy, nickel, nickel alloy, iron and iron alloy.

30. The composite rotary tool of claim 27, wherein the weight percentage of the binder in the first cemented carbide material differs from the weight percentage of binder in at least one the core cemented carbide material and the second cemented carbide material.

* * * * *

UNITED STATES PATENT AND TRADEMARK OFFICE
CERTIFICATE OF CORRECTION

PATENT NO. : 6,511,265 B1
DATED : January 28, 2003
INVENTOR(S) : Mirchandani et al.

It is certified that error appears in the above-identified patent and that said Letters Patent is hereby corrected as shown below:

Column 1,
Line 17, please replace "microstucture" with -- microstructure --.
Line 33, please delete ".are" and replace with -- are --.

Column 4,
Line 44, please delete "density" and replace with -- densify --.

Column 6,
Line 3, please delete "to.one" and replace with -- to one --.

Column 9,
Line 49, please delete "interrupteded" and replace with -- interrupted --.

Column 11,
Line 2, add -- ( -- before the word "average"

Column 12,
Line 63, "claim 11" should be -- claim 3 --.

Signed and Sealed this

Eighth Day of June, 2004

JON W. DUDAS
*Acting Director of the United States Patent and Trademark Office*